United States Patent Office 2,797,602
Patented July 2, 1957

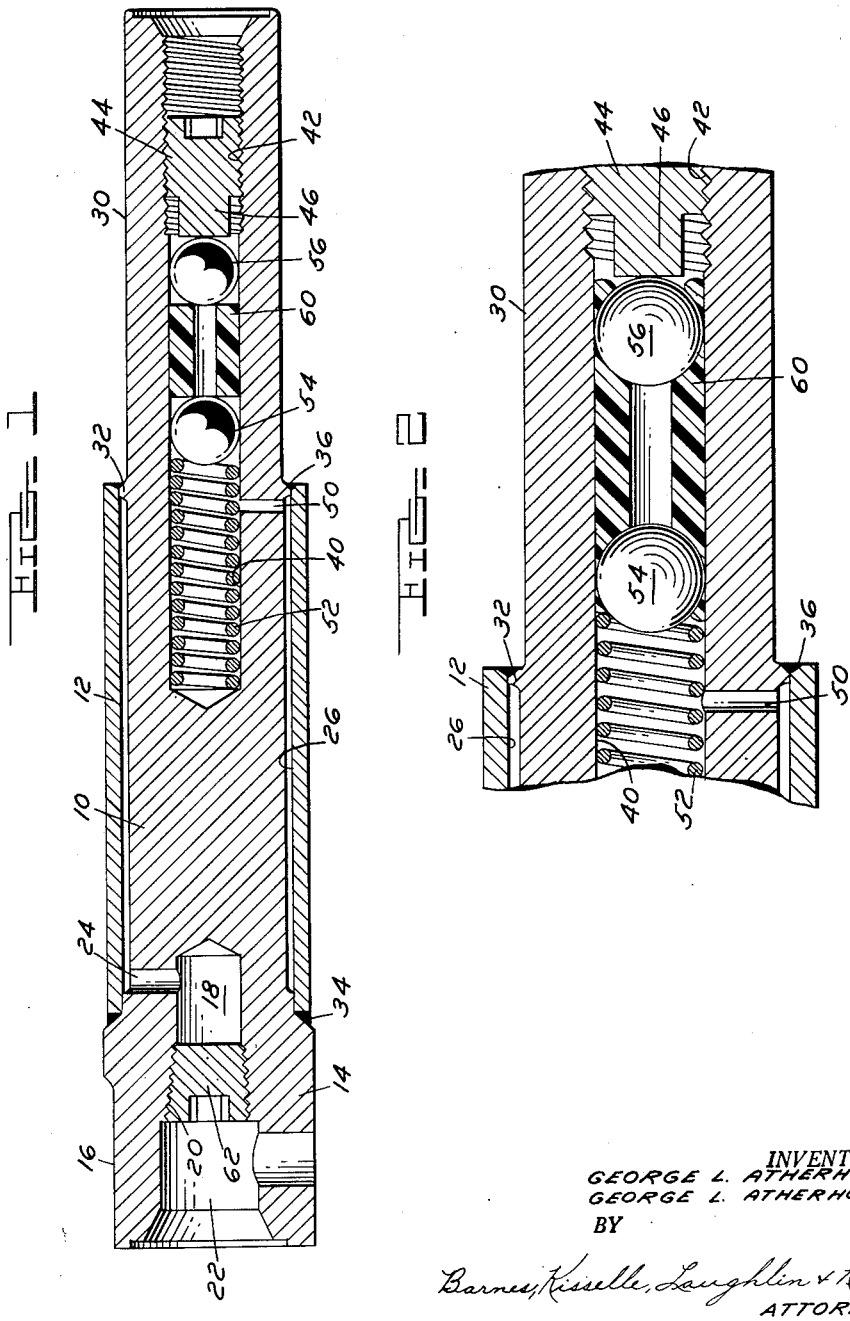

2,797,602

HYDROSTATIC HOLDING DEVICES

George L. Atherholt, Sr., Flint, and George L. Atherholt, Jr., Ferndale, Mich.

Application June 5, 1953, Serial No. 359,886

7 Claims. (Cl. 82—44)

This invention relates to a hydrostatic holding device and particularly to that type of device which is called an expanding mandrel or chuck for either external or internal holding units.

Devices of the hydrostatic type are illustrated in the Christman Patent No. 1,818,042 of August 11, 1931, and the Conradson Patent No. 2,318,838 of May 11, 1943.

The present invention contemplates an improved type of expansion device which overcomes some of the practical problems inherent in the previous designs. One of the problems is sealing of the cylinder or mandrel at the respective ends and particularly at that end wherein pressure is applied. Another of the problems is limiting the pressure which can be applied to prevent overpressure. Other problems include selection of the materials for forming the device and methods of construction.

It is an object of the present invention to provide an improved seal and pressure unit for a hydrostatic mandrel which provides a self-sealing unit readily operable without destruction for an unlimited number of operations, and a device which is tamper-proof and which permits extremely accurate work with a properly designed mandrel. This pressure device can be used for both internal and external holders and can be used singly or in combination with similar units. One advantage is that with very slight movement extremely high pressures can be developed.

Briefly, the specific invention here lies in a combination of an open bore and connected passageway with a sealing assembly in said bore comprising a resilient seat, for example, a coil spring; a pair of balls, one on said seat; and a tube of soft, tough, material between said balls. An axial plug forcing these balls into this tube expands it and moves it axially to provide a seal and a pressure unit.

Other objects and features of the invention having to do with details of construction and operation will be brought out in the following description and claims.

Drawings accompany the specification, and the various views thereof may be briefly described as:

Figure 1, a longitudinal sectional view of the mandrel after it has been filled with grease and prior to the full insertion of the control plug.

Figure 2, a longitudinal sectional view of the sealing assembly ready for operation.

Referring to the drawings, the expanding holding sleeve is shown comprised of two main parts, a body 10 and a cylindrical shell 12. The body 10 extends through the mandrel and on either end thereof. One end 14 of the body has a diameter greater than the shell 12 with a flat 16 provided for driving purposes, and this body has a central bore 18 enlarged to a threaded pipe tap 20 and then to an opening 22. A passage 24 connects bore 18 to the outside of the body to a circumferential space 26 formed between the shell 12 and the body.

The other end 30 of the body 10 has a smaller diameter than the shell 12 and is provided with one enlarged annular portion 32. The shell 12 is slipped over the end 30 and may be hydrogen-welded against the head portion 14 at 34 and on the annular portion 32 at 36. The sleeve 12 is preferably formed of 8620 steel with no sulphur content, since hydrogen welding cannot be successfully accomplished with a steel having this ingredient. The end 30 of the body portion is provided with a central bore 40 which is enlarged at the outer end 42 to provide a recess for an Allen screw 44 with a threaded head, said screw having a projection 46, the purpose of which will be later described.

The circumferential chamber 26 is connected to bore 40 by a radial passage 50. Seated at the bottom of the bore 40 is a spring 52 of relatively tight construction. This spring forms a seat for a ball 54 which has a very slight clearance in the bore 40, for example, .0001 inch.

A second ball 56 is also placed in the bore 40 ahead of the projection 46 on screw 44 and interposed between the balls 54 and 56 is a sleeve or tube 60 of 89–90 Durometer hardness. This sleeve 60 has been successful when formed of a material called "Tygon" manufactured by the Dow Chemical Company of Midland, Michigan. For use in a bore of $5/16$ inch diameter, the sleeve 60 preferably has an internal diameter of about one-third of the external diameter and a length of $5/8$ inch. This may vary somewhat, depending on the needs of the particular mandrel, but a sleeve with the above dimensions has proved to be a successful unit. A solid plastic insert will operate, but the tube permits easier assembly and will transmit pressure axially more easily and more satisfactorily. The tube centers the balls for pressure application.

In the setting up of the device for use, it is preferred that all of the elements described in bore 40 be removed temporarily; and a cylindrical member, not shown, having a sliding fit with the bore is inserted therein.

A Zircon grease fitting is then threaded into the pipe tap 20, and grease is fed into the unit through the passages 18 and 24. Once the grease fills the circumferential chamber between the body and the shell, it will then feed through the radial passage 50 to the bore 40, pushing any air in the chambers ahead of it. This grease will then force the before-mentioned cylindrical plug out of the bore 40, the plug forming sufficient resistance to insure no pockets remaining in the unit.

Once the device is entirely filled with grease, the spring 52 is inserted, followed by the ball 54, the sleeve 60 and the ball 56. A plug 62 is then screwed into the tap 20 after removal of the grease fitting to seal bore 18 positively against extremely high pressures. Subsequently, the threaded Allen screw 44 is threaded into the bore 40 to contact the ball 56.

Further screwing motion of the screw 44 will force the balls 54 and 56 into the tube 60, which has an internal diameter of about one-half the diameter of the balls. The walls of the tube 60 actually extrude around the balls so that a cartridge is formed by the three units, it being understood that the tube would be full of grease between the two balls. Figure 2 shows the unit as assembled for use with the balls pushed into the tube to form a sealing cartridge.

It will be understood that when the balls are forced into the sleeve 60 the sleeves will be expanded against the walls of the bore 40 mechanically and hydraulically to seal it against extremely high pressures. In spite of this sealing, pressure may be transmitted through the tube by screwing the unit 44 against ball 56 so that expansion pressure may be transmitted to chamber 26 by motion of screw 44. The pressure that can be applied in chamber 26 is limited by the travel of spring 52 which forms a positive stop for the sealing cartridge.

In place of grease in the unit, other materials may be used, such as liquid silicon, wax or powdered nylon.

We claim:

1. An expanding chuck or arbor of the hydrostatic type having a relatively thin-walled cylinder, a means for the application of pressure to a fluid within said cylinder which comprises, a body associated with the cylinder having a cylindrical opening, a passageway in said body connecting the inner wall of said cylinder to said opening, a pressure application cartridge within said opening comprising a cylinder of relatively soft material, a ball closing each end of said soft cylinder, and means within said opening to exert axial pressure on said cartridge transmittable to fluid within said opening and said cylinder, said soft cylinder being expansible around said balls and against the walls of said cylinder responsively to pressure on one end thereof and fluid pressure on the other end thereof.

2. In an expanding holding device of the hydrostatic type including a body and a thin-walled cylinder associated with said body with a passage in the body for the application of pressure to a relatively incompressible liquid within the cylinder, means in said passage for sealing said passage and for transmitting pressure to fluid within said cylinder which comprises a tube of soft, compressible, expansible material with a hard steel ball at each end of said tube forced into said tube to expand fluid within the tube against the walls of the tube, thus forcing the tube circumferentially against the walls of the passage, resilient means at one end of said sealing unit, and axially movable, force-supplying means in said passage at the other end of said sealing unit for adjusting the position of the unit in the passageway.

3. In an expanding mandrel of the hydrostatic type including a body and a thin-walled cylinder mounted on said body with a passage in the body for the application of pressure to a relatively incompressible liquid within the cylinder, a pressure control means within said passage for a body of relatively incompressible fluid within said cylinder comprising a coil spring seated in said passage, two balls in said passage having a relatively close fit with the walls of said passage, one of said balls being seated on said spring, a tube of relatively soft material interposed between said balls, the balls being forced into the ends of said tube to expand the tube against the walls of the bore in sealing engagement, and means adjacent the outer end of the passage axially shiftable therein to contact the outer of said balls and transmit pressure to confined liquid in said cylinder.

4. In an expanding mandrel of the hydrostatic type having a relatively thin-walled cylinder associated with a supporting body having passages accessible from the outside and leading to the interior of said cylinder, a means for simultaneously sealing and developing pressure within said passages comprising a coil spring seated at one end in one of said passages, a cylinder of relatively soft material snug within said one passage, a ball at each end of said cylinder snug within said passage, one of said balls being seated at the other end of said spring, and means extending into said passage to urge the other of said balls against said cylinder, said soft cylinder being expansible around said balls and against the walls of said cylinder responsively to pressure on one end thereof and fluid pressure on the other end thereof.

5. In an expanding mandrel of the hydrostatic type having a relatively thin-walled cylinder, a means for the application of pressure to a fluid within said cylinder which comprises a body associated with the cylinder having a bore opening outside said cylinder and a passageway connecting said bore to the interior of said cylinder, a compression spring seated in said bore adjacent said passageway permitting flow from said passageway to the interior of said bore, a pair of balls in said bore dimensioned to have moving clearance in said bore positioned to be responsive to the action of said spring, a tube interposed between said balls also having moving clearance in said bore, said tube being formed of expandable material and the balls being forced into the ends of said tube to force it circumferentially against the walls of the bore, and means extending into said bore operable to influence the tube and ball assembly to shift it inwardly against said spring whereby said assembly seals said bore and transmits pressure to a fluid in said bore and passageway.

6. An expanding chuck or arbor of the hydrostatic type having a relatively thin-walled cylinder, a means for the application of pressure to a fluid within said cylinder which comprises, a body associated with the cylinder having a cylindrical opening, a passageway in said body connecting the inner wall of said cylinder to said opening, a pressure application cartridge within said opening comprising a cylinder of relatively soft material, a relatively hard element at each end of said soft cylinder, each of said elements having generally radially outwardly divergent portions positioned to engage an end of said soft cylinder, and means within said opening to exert axial pressure on said cartridge transmittable to fluid within said opening and said cylinder, said soft cylinder being expansible around said elements and against the walls of said cylinder responsively to pressure on one end thereof and fluid pressure on the other end thereof.

7. An expanding chuck or arbor of the hydrostatic type comprising, a relatively thin-walled cylinder, a body concentric with said cylinder and spaced therefrom to define an annular chamber, an axial bore in said body, passageway means in said body interconnecting said bore and said chamber, an axially shiftable pressure forming cartridge in said bore, said cartridge including a relatively soft cylinder flanked axially by relatively harder elements, said elements having curviform portions adjacent said soft cylinder, axially shiftable operating means extending into said bore, said operating means being operable to shift said cartridge to form pressure in a fluid in said bore and chamber, said soft cylinder being expansible radially against the walls of the bore and around said curviform portions responsively to axial pressure on said elements incident to shifting of said cartridge, whereby to form a seal between said cartridge and bore, and spring means in said bore operative to return said cartridge when the force of said operable means on said cartridge is relieved.

References Cited in the file of this patent

UNITED STATES PATENTS

| | | |
|---|---|---|
| 1,818,042 | Christman | Aug. 11, 1931 |
| 2,318,838 | Conradson | May 11, 1943 |
| 2,393,747 | Buchanan | Jan. 29, 1946 |
| 2,411,229 | Pratt | Nov. 19, 1946 |
| 2,512,098 | Gratzmuller | June 20, 1950 |
| 2,612,420 | Reynolds | Sept. 30, 1952 |
| 2,630,039 | Klemm | Mar. 3, 1953 |

FOREIGN PATENTS

| | | |
|---|---|---|
| 300,209 | Italy | Sept. 1, 1932 |